United States Patent [19]

Römer et al.

[11] Patent Number: 4,640,938
[45] Date of Patent: Feb. 3, 1987

[54] RADIATION-CURABLE COMPOSITION, A PROCESS FOR PREPARING SAME, AND THE USE THEREOF

[75] Inventors: Manfred Römer, Stuhr; Peter Woletz; Klaus Kruger, both of Bremen, all of Fed. Rep. of Germany

[73] Assignee: Morton Thiokol GmbH, Fed. Rep. of Germany

[21] Appl. No.: 664,120

[22] Filed: Oct. 23, 1984

[30] Foreign Application Priority Data

Oct. 31, 1983 [DE] Fed. Rep. of Germany ....... 3339485

[51] Int. Cl.$^4$ .............................................. C08F 8/00
[52] U.S. Cl. ........................................ 522/79; 522/74; 522/99; 522/104; 522/148; 522/150; 522/173; 522/178; 522/902; 524/277; 524/284; 524/315; 524/763; 524/765; 524/773; 524/849
[58] Field of Search ..................... 204/159.16, 159.14, 204/159.22, 159.23, 157.1 R; 524/277, 284, 315, 763, 765, 773, 849; 522/79, 74, 99, 104, 148, 150, 153, 902, 178, 173

[56] References Cited

U.S. PATENT DOCUMENTS

| | | | |
|---|---|---|---|
| 4,082,710 | 4/1978 | Vrancken et al. | 525/445 |
| 4,112,138 | 9/1978 | Davis et al. | 427/54.1 |
| 4,206,025 | 6/1980 | Vrancken et al. | 525/437 |
| 4,218,294 | 8/1980 | Brack | 525/426 |
| 4,265,723 | 5/1981 | Hesse et al. | 525/20 |
| 4,303,696 | 12/1981 | Brack | 427/44 |
| 4,461,784 | 7/1984 | Baulmann | 427/54.1 |

FOREIGN PATENT DOCUMENTS 0092401  4/1983  European Pat. Off. .

OTHER PUBLICATIONS

"Barrier Coats Versus Inert Atmospheres, the Elimination of Oxygen Inhibition in Free-Radical Polymerizations", D. A. Bolon and K. K. Webb, Journal of Applied Polymer Science, vol. 22, 2543–2251 (1978).
Schmid, "Photoiniators and Their Influence on Color Development in UV Cured Films," Radiation Curing VI Conference Proceedings, Association for Finishing Processes of SME, pp. 4–1 and 4-6 (1982).
"Evaporation Control of Monomers from Solventless Resin Compositions", S. H. Schroeter, D. A. Bolon, K. K. Webb, and J. E. Moore, Radiant Phys. Chem., vol. 14, pp. 869–892, Pergamon Press Ltd., 1979.

Primary Examiner—Melvyn I. Marquis
Attorney, Agent, or Firm—George F. Wheeler; Gerald K. White

[57] ABSTRACT

The specification describes a composition curable by high-energy radiation in the presence of oxygen which contains conventional monomers, oligomers and/or polymers curable by high-energy radiation besides minor amounts of a natural wax, a solvent extraction product of a natural wax, a wax alcohol, a wax ester and/or a wax carboxylic acid. The specification also describes the preparation of said composition and the use thereof in the formation of coatings.

10 Claims, No Drawings

RADIATION-CURABLE COMPOSITION, A PROCESS FOR PREPARING SAME, AND THE USE THEREOF

It is well known in the art that various polymers, e.g. acrylic resins, can be crosslinked by high-energy radiation, such as ultraviolet radiation, α-, β- and γ-radiation. Hitherto such crosslinking reactions have been utilized in curing lacquers, for example (German Offenlegungsschrift 2,029,145).

Such a polymerization by radiation, e.g. curing of lacquers, when carried out in the presence of atmospheric oxygen, has the disadvantage that an incompletely cured, easily scratched or even tacky surface film is formed. Therefore, surface curing had to be carried out in the absence of atmospheric oxygen. To this end various modes of operation were used, e.g. the polymer surface to be cured was protected from contact with air by a strong sheet covering, by a protective gas such as helium, nitrogen, carbon dioxide, a mixture of nitrogen and carbon dioxide gas, or by a liquid such as water (German Offenlegungsschrift 2,029,145). Aside from the additional expense, such sheathing had the disadvantage of requiring complicated equipment. Moreover, it proved to be impossible to homogeneously protect, and thus to uniformly cure, surfaces of irregular configuration, e.g. with cavities resulting from the construction thereof. When the coatings are protected by liquid or by sheets, the additional disadvantage is encountered that the sheet and liquid material must be removed after the curing treatment. Moreover, attempts were made to attain sheathing of the reactive surface from oxygen by admixture of paraffin in coating compositions to be cured. This results in the so-called buffing lacquers used, for example, in the furniture industry, which have the drawback that the paraffin migrates to the surface and must be removed by buffing after curing; moreover, the attained curing effect is not satisfactory for all applications.

Therefore, it is the object of the invention to provide a process for the polymerization of high-energy radiation-curable polymers, or oligomers and/or monomers by irradiation with high-energy radiation which can be carried out without any protective sheathing in the presence of oxygen, and to provide the suitable polymer, oligomer and/or monomer material.

According to the invention, this object is realized in that to a polymer, oligomer and/or monomer composition curable by high-energy radiation, such as α-, β- and/or especially γ-radiation, there are admixed, prior to curing, one or more natural waxes, extraction products of such natural waxes, wax alcohols, wax esters and/or carboxylic acids contained in natural waxes.

It has unexpectedly been found that the addition of even minor proportions of natural waxes, extraction products of natural waxes, wax alcohols, wax esters and/or carboxylic acids contained in natural waxes (hereafter termed wax acids) to compositions curable by high-energy radiation permits radiation curing in the presence of oxygen, such as atmospheric oxygen. The thereby obtained cured products possess a non-tacky, scratch-resistant and glossy surface which could hitherto be attained only with inert gas sheathing and which is even better for certain applications requiring especially mechanical strength.

The waxes to be added according to the invention are natural waxes, namely vegetable, animal and/or mineral waxes. These waxes may also be chemically modified. The waxes can be used per se or in mixtures of two or more. It is also possible to use solvent extraction products of said waxes.

Examples for suitable waxes are natural waxes, viz. waxes containing functional groups such as vegetable waxes; animal waxes such as insect waxes; fossil waxes; and chemically modified, e.g. synthetically upgraded waxes of these types. Such waxes are described, for example, in Ullmann's Encyklopädie der technischen Chemie, Vol. 18, 1967, pages 262 to 305, especially pages 281 to 301. Further examples for suitable waxes are described in Kirk Othmer, Vol. 22, pages 156 to 173.

It has been found that the desired curing characteristics cannot be achieved with paraffin waxes which lack the characteristic functional groups of natural waxes such as vegetable, animal, and fossil waxes, and which thus do not exhibit the polarity typical of said waxes.

Especially favorable results are achievable according to the invention by the addition of carnauba wax, candelilla wax, Japan wax, montan wax, shellac wax, sperm oil, lanoline, jojoba wax, bees wax, sugar can wax, ouricouri wax, esparto grass wax.

The waxes can be employed in the form of a wide variety of commercial products or of purity grades; carnauba wax, for example, in the form of Florfina (No. 1 yellow) and Primeira (No. 2 yellow), in the different purity grades of the U.S. scale, and as Carnaubin (refined carnauba wax).

In lieu of the above mentioned natural waxes also solvent extracts of said waxes can be employed after removal of the solvent. The solvent employed may be selected among conventional aliphatic, aromatic, and optionally extraction solvents containing functional groups, e.g. alcohols (such as methanol, ethanol, isopropanol, n-butanol, i-butanol); esters (such as ethyl acetate, butyl acetate); aromatic hydrocarbons (such as benzene, toluene); halogenated aliphatic hydrocarbons (such as methylene chloride); and mixtures of said extractants.

Extraction can be accomplished, for example, by treatment for several hours with boiling solvent in conventional commercial extraction apparatuses.

Thus, for instance, alcoholic, especially ethanolic, extracts of carnauba wax and candelilla wax have proved especially favorable which were obtained by treatment of the commercial waxes for several hours. The extracted material, after removal of the solvent, is wax-like and, when added to monomer, oligomer and/or polymer compositions subjected to curing in the absence of protective gas, results in products exhibiting an especially high degree of brilliance and a high degree of gloss.

In lieu of the natural waxes employed according to the invention also wax alcohols, wax esters and/or wax carboxylic acids may be used which are contained in said natural waxes. The wax alcohols and wax acids are products containing from 15 to 40, especially 20 to 35, and preferably 22 to 34 carbon atoms. The wax alcohols, for example, are higher homologues of saturated fatty alcohols, especially unbranched fatty alcohols, such as ceryl alcohol, myricyl alcohol, melissyl alcohol and lacceryl alcohol, cerotyl alcohol, geddyl alcohol.

The wax fatty acids are saturated unbranched fatty acids, for example, such as lignoceric acid, cerotinic acid, melissic acid.

The wax esters are esters of the aforementioned wax acids and wax alcohols. The wax acids may be esterified with the wax alcohols. Moreover, also esters of the wax alcohols with lower carboxylic acids such as acetic acid, propionic acid, or esters of the wax fatty acids with lower alcohols such as methanol, ethanol, propanol, butanol, may be employed.

The wax alcohols, wax esters and wax carboxylic acids may be used in mixture. Such directly useful mixtures can be prepared by alkaline hydrolysis of the aforementioned natural waxes and subsequent extraction followed by the usual processing steps. Alkaline hydrolysis is effected by treatment for an extended period of time of a solution of the natural wax in a suitable organic solvent, such as an aromatic solvent like benzene or toluene, for from 10 to 20 hours in the heat, e.g. under reflux conditions, with an aqueous-alkaline solution (e.g. sodium hydroxide solution).

The compositions curable by the addition, according to the invention, of natural waxes, chemically modified products of said natural waxes, extracts of said natural waxes, wax alcohols, wax esters and/or wax carboxylic acids are the commonly used monomers, oligomers and/or polymers curable by high-energy radiation, especially liquid, ethylenically unsaturated monomers, oligomers, and/or polymers. Especially suitable substances are monomers, oligomers and/or polymers curable by electron beams, e.g. monomers, oligomers and/or polymers on acrylate and/or methacrylate basis.

In particular, these are the pure acrylates and/or methacrylates and/or methacrylic acid esters; polyester acrylates and/or methacrylates; polyether acrylates and/or methacrylates; epoxyacrylates and/or methacrylates, and polyurethane acrylates and/or methacrylates. Also radiation-curable polysiloxanes, especially silicone acrylates or methacrylates, polyesters on the basis of fumaric acid and polyesters on the basis of maleic acid are suitable, as commonly used in the furniture lacquer area, and dienes, such as polybutadiene.

Particularly well suited monomers are mono- or polyacrylated and/or polymethacrylated polyols among which polyacrylated polyols are preferred on account of their higher reaction rate.

Polyols forming the basis of the monomers useful according to the invention may have straight or branched chains and may contain one or more hetero atoms in the chain, e.g. in the form of oxygen bridges. They preferably have from 2 to about 10, especially 5 to 9, and most preferably 5 or 6 carbon atoms. They preferably contain 2 to about 5 and especially 2, 3 or 4 hydroxyl functions. Preferred examples for such polyols are:

Trimethylolpropane, pentaerythritol, hexanediol, especially hexane-1,6-diol, and polyethylene glycols or propylene glycols such as triethylene glycol or tripropylene glycol.

The hydroxyl groups of the said polyols may be entirely or partially esterified by acrylic acid and/or methacrylic acid.

Special examples for monomers useful according to the invention are trimethylolpropane triacrylate, hexanediol diacrylate, pentaerythritol tetraacrylate, pentaerythritol triacrylate, hexane-1,6-diol diacrylate, diethylene glycol diacrylate, triethylene glycol diacrylate, tetraethylene glycol diacrylate, tripropylene glycol diacrylate, 2-hydroxyethyl acrylate, 2-hydroxypropyl acrylate, hexanediol monoacrylate and butanediol monoacrylate and the corresponding methacrylates or mixed acrylates/methacrylates.

The monomers may be employed per se or in mixture, optionally with high or low molecular weight prepolymers.

The polymers may be high or low molecular weight resins or oligomers which are liquid or soluble in inert and/or reactive organic liquids. Examples therefor are soluble polyurethane acrylates formed from the aforementioned hydroxy-functional acrylate monomers.

The molecular weight of such resins or oligomers is preferably within the range of from 800 to 8000 and the viscosities thereof range from 1000 to 50,000 mPa.s. The content of acrylically or methacrylically unsaturated monomer units may be 2 to 6 per molecule, for example.

Such resins are prepared according to conventional methods, for instance in the manner described in German Offenlegungsschrift 2,530,896 and 2,542,314. Thus, for example, a polyol is reacted with a diisocyanate. The attained content of free NCO groups is then saturated with hydroxy-functional acrylate or methacrylate monomers. The expert can select quantities and reaction conditions in such a way that the desired molecular weights and the desired content of acrylically and/or methacrylically unsaturated monomer units is obtained. The viscosities, for example, can be varied by accordingly diluting the resins with monomers.

By way of example, the following raw materials may be employed as starting materials for the polyurethane acrylates or methacrylates useful as polymers or oligomers, which preferably have a molecular weight from 2000 to 7000:

Isocyanates such as:
  (a) 4,4-diphenylmethane diisocyanate
  (b) toluylene diisocyanate
  (c) hexamethylene diisocyanate
  (d) 4,4-dicyclohexylmethane diisocyanate Polyols such as:
  (a) polypropylene glycols, polyethylene glycols having molecular weights of 400, 1000, 2000, 3000, 4000
  (b) polyesters on the basis of aliphatic and aromatic dicarboxylic acids, preferably adipic acid and sebacic acid, and difunctional aliphatic alcohols such as ethylene glycol and neopentyl glycol, diethylene glycol, hexanediol-1,6 and polyfunctional alcohols such as trimethylolpropane and pentaerythritol Hydroxy-functional acrylate monomers and methacrylate monomers reactive with NCO groups such as:
  2-hydroxyethyl acrylate
  2-hydroxyethyl methacrylate
  2-hydroxypropyl acrylate
  2-hydroxypropyl methacrylate
  butanediol monoacrylate
  hexanediol monoacrylate
  pentaerythritol triacrylate Depending on the required viscosity, the prepared resins may be diluted with monomers to concentrations of from 60 to 80%:
  hexanediol-1,6-diacrylate
  butanediol-1,4-diacrylate
  triethylene glycol diacrylate
  tetraethylene glycol diacrylate
  dipropylene glycol diacrylate
  tripropylene glycol diacrylate
  tetrapropylene glycol diacrylate Hereafter an example will be given for a special formulation:
  1 equivalent: polypropylene glycol, mol. wt. 400
  2 equivalents: tolylene diisocyanate 80/20

1 equivalent: 2-hydroxyethyl acrylate

The product thereby obtained is dissolved in hexanediol-1,6 diacrylate up to a concentration of 70%.

mol. wt.$_{resin}$ = 980
viscosity: 600–1200 mPa·s
functionality: 2

The curable compositions used in the process of the invention are mixed in liquid form with the natural waxes, natural wax extraction products, wax alcohols, wax esters and/or wax carboxylic acids and cured, for example, by electron beam curing. The liquid form is obtained either by the use of liquid monomers, oligomers and/or polymers, or by dilution of solid or high viscosity polymers or oligomers with liquid monomer (reactive diluent), or by thermal treatment. If occasion arises, the curable compositions may also be dissolved in a readily volatile solvent, mixed with the additive according to the invention, and applied to a substrate by spraying (e.g. in the form of a paint solution), whereupon the solvent evaporates and radiation curing proper takes place.

In any case the aforementioned natural wax or derivative is admixed to the liquid curable composition prior to curing.

It has been found that a very low content of natural wax, solvent extraction product, wax alcohol, wax ester and/or wax carboxylic acid is sufficient to attain the advantages of the invention of curing in the presence of oxygen, no matter in what concentrations.

In a formulation of monomer, oligomer and/or polymer including the contents of conventional pigment, extender and of further conventional additives, the amount of wax or the amount of added active substances is advantageously 0.01 to 3% by weight, especially 0.1 to 1% by weight.

The active substances of the invention are so incorporated into the composition to be polymerized as to ensure homogeneous distribution therein. Thus, for instance, the composition to be polymerized may be heated to a temperature above the melting temperature of the wax (generally up to about 80° C.), whereupon the wax is added in the heat as such, e.g. as a solid or in the molten state. Optionally the wax can also be added in solution in a customary solvent, if the viscosity of the overall composition is to be lowered, e.g. in order to prepare a sprayable solution. The solvent can be selected among customary ester solvents such as ethyl acetate. The temperature of the composition must be so that a homogeneous distribution of the wax is possible at the time of admixture. Optionally homogeneous distribution can be accomplished also with the use of a colloid mill.

After homogeneous distribution or dissolution of the resin in the composition to be polymerized, the composition is cooled in such a manner that the homogeneous distribution of the wax is retained, for example the composition is cooled to room temperature with stirring in order to avoid undesirable agglomeration of the wax.

In general, in this way a stable polymerizable composition is obtained which can be directly subjected to curing. It has been found that, if agglomeration of the added waxes should nevertheless occur, stable, storable suspensions can be obtained when, after cooling, the composition is comminuted in the colloid or sand bead mill. Comminution may be combined with the admixture of customarily used pigments, extenders, and other customary adjuvants.

In this way also stable wax-containing mixtures of oligomers or polymers can be obtained to which further monomer is added (as reactive diluent) shortly before use. In that case the wax content of the polymer and/or oligomer concentrate is so adjusted that after dilution with the required amount of reactive diluent the desired final wax content of the composition to be cured is reached. Thus, for instance, the wax content, or the content of the active substances added according to the invention, in the oligomers and/or polymers prior to further dilution is 1.4 to 2.8 and most favorably about 1.8%, based on the total weight of curable oligomer and/or polymer.

For example, a concentrate can be prepared which contains 75% of the later total amount of curable materials in the form of oligomers with the required wax content. The remaining 25% of the total amount can be added as monomers at a later time; if occasion arises, the composition is then comminuted once more, as explained above, in order to ensure homogeneous distribution of the wax. Of course, it is also possible to add further oligomers in lieu of the monomers, or to prepare a monomer concentrate containing the required amount of wax, and to dilute said concentrate with oligomers or monomers later.

The curable compositions of the invention are especially suited for producing top, protective or lacquer coats on all sorts of substrates, e.g. metals, plastic, wood and other materials used, for example, in the automobile industry. In line with this application the compositions may contain commonly used adjuvants and additives such as pigments, dyestuffs, extenders, coupling agents and/or adhesives, wetting agents and other customary additives. The amounts of said additives are within the usual ranges familiar to the expert.

With the compositions of the invention curable coatings can be prepared which cure in the absence of inert gas or other protective measures for exclusion of atmospheric oxygen to form non-tacky coatings within fractions of a second by electron beams or other high-energy radiation. The surfaces of the substrates cured according to the invention exhibit special mechanical strength such as scratch resistance, abrasion resistance and impact strength. The adhesion to the substrate is excellent. Surprisingly it has been found that, for example, spray filler and spray primer or the like obtained according to the invention can be topped with conventional lacquers such as nitro combination lacquers, oven-drying lacquers or two-component lacquers with good adhesion of said lacquers (GT=O).

The mode of operation of the invention has proved to be especially advantageous in coating complicated three-dimensional structures such as engine blocks, automobile wheel rims etc. where radiation curing, also with the method using protective gases, brought about only unsatisfactory results because it was frequently difficult to sustain a sufficiently high concentration of the protective gas in difficultly accessible places in order to achieve the desired success of uniform curing.

Hence, the compositions of the invention are suited, for example, as anti-corrosion coat on various substrates, especially sheet steel, cast iron, magnesium, for coating plastic, e.g. in the automobile industry, for decoration and protection purposes, as lacquers, as primer system (so-called spray fillers) capable of being topped with conventional lacquers, and for coating sheet materials (e.g. metal strip) by the conventional coil coating technique. As mentioned before, customary pigments and dyestuffs can be added. Moreover, the compositions of the invention are suited also for the preparation of adhesive systems.

It has been surprisingly found that on the surface of cured coatings made from the compositions of the invention no typical characteristics of the waxes employed can be detected, such as those encountered, for example, with the use of paraffins, namely dulling and typical paraffin wax flooding. This may possibly be due to grafting of the wax or active ingredient molecules to the polymer chains of monomers, oligomers and polymers during irradiation with high-energy radiation.

Curing of the compositions of the invention is effected by means of conventional apparatuses for radiation curing, e.g. for electron beam curing, as employed for the hitherto conventional curing under protective gases, whereas the means for supplying and removing the protective gases have become superfluous.

The radiation dosage may, for example, be within the range of the normal dosage when operating under nitrogen protection and may also be somewhat higher. For metal substrates 4 to 40 mrad or 40 to 400 kGy, respectively, have proved to be favorable. Plastic moldings are cured, for example, at 6 to 60 mrad or 60 to 600 kGy, and paper substrates or plastic web at 2.5 to 10 mrad or 25 to 100 kGy. The acceleration potentials generally range from 150,00 to 1,000,000 eV.

The following examples are given by way of further explanation of the invention.

General mode of operation for preparing the compositions of the invention:

1. preparing an oligomer/polymer from monomer units in the
customary way, such as polyaddition or polycondensation;
2. diluting the oligomer/polymer with monomer (reactive diluent), e.g. to a concentration of 60 to 85%, especially 75%, by adding of from 40 to 15%, especially 25%, of the reactive diluent at elevated temperature, e.g. 60 to 80° C.;
3. adding the natural wax;
4. slowly cooling while stirring;
5. leaving to stand and optionally comminuting, optionally while adding further reactive diluent, pigments, and other commonly used adjuvants and additives.

EXAMPLE 1

Preparation of a Single-Layer Lacquer (Black)

Formulation:

8.0 parts by wt: black iron oxide
0.5 part by wt: carbon black
6.0 parts by wt: talcum (extender)
6.5 parts by wt: aluminum silicate pigment (extender)
0.5 part by wt: customary wetting agent
18.0 parts by wt: aromatic polyurethane acrylate having a molecular weight of about 3500 and containing 1.8% by weight of carnauba wax (commerically available as Resitron 8773)
20.0 parts by wt: aliphatic polyurethane acrylate having a molecular weight of about 6000 and containing 1.8% by weight of carnauba wax (Resitron 8726/1)
8.5 parts by wt: unsaturated polyester diluted with reactive diluent as coupling agent (Resitron Additiv 424)
20.0 parts by wt: hexanediol-1,6 diacrylate (reactive diluent)
10.0 parts by wt: ethylene diglycol acrylate (reactive diluent)
2.0 parts by wt: copolymerized phosphonic acid ester as coupling agent (commercially available as Ebecryl 170 PA)

The two wax-containing polyurethane acrylates are mixed with the ethylene diglycol acrylate. All pigments and extenders are admixed. Thereafter the composition is stirred up to homogeneity and comminuted in the bead mill. Then the hexanediol-1,6 diacrylate and the coupling agent are added. The composition is again homogenized and finally screened. The resulting composition is sprayed onto a substrate without inert solvents and is cured at 30 mrad and at a potential of 150 to 220 keV in the presence of atmospheric oxygen.

There was obtained a glossy black surface which was fully cured and tack-free.

In this example the total content of carnauba wax in the composition was 0.684% by weight.

Comparative Test A

Formulation:
like in Example 1 but without the addition of carnauba wax.

Processing and irradiation as described in Example 1 resulted in a tacky, incompletely cured black surface.

Comparative Test B

Formulation:
like in Example 1 but without the addition of carnauba wax.

Processing and irradiation as described in Example 1, but in the absence of air which was replaced by a protective nitrogen gas atmosphere, resulted in a dry, hard, black surface comparable to that of Example 1.

EXAMPLE 2

Preparation of a Wheel Rim Lacquer (Silver)

Formulation:

12.0% by wt: aluminum bronze metal pigment
24.0% by wt: aliphatic polyurethane acrylate resin having a molecular weight of about 4500 and containing 2.5% by weight of carnauba wax (Resitron 8778)
23.0% by wt: aliphatic polyurethane acrylate having a molecular weight of about 6500 (Resitron 87-28)
10.0% by wt: unsaturated polyester diluted with reactive diluent as coupling agent (commercially available as Add. 424)
17.0% by wt: hexanediol-1,6 dimethacrylate (as reactive diluent)
14.0% by wt: ethylene diglycol acrylate (as reactive diluent)

The metal pigment and the two reactive diluents were compounded. Thereafter the other constituents were added and the composition was homogenized in a high-speed stirrer. After screening the composition was sprayed without solvent onto a primed metal plate and was cured at a radiation dosage of 30 mrad at a potential of 150 to 220 keV in the presence of air. There was obtained a silver colored glossy, hard coating.

EXAMPLE 3

Preparation of a Filler (White)

Formulation:

10.0 parts by wt: titanium dioxide pigment
10.0 parts by wt: barium sulfate (extender)
7.0 parts by wt: talcum (extender)
8.0 parts by wt: aluminum silicate pigment (extender)
1.0 part by wt: conventional wetting agents
14.0 parts by wt: aliphatic polyurethane acrylate having a molecular weight of about 6000 (Resitron 87-26)
10.0 parts by wt: polyurethane acrylate having a molecular weight of about 3500 and containing 1.8% carnauba wax
23.0 parts by wt: hexanediol-1,6 diacrylate (reactive diluent)
15.0 parts by wt: ethylene diglycol acrylate (reactive diluent)
2.0 parts by wt: copolymerized phosphoric acid ester as coupling agent (Ebecryl 170 PA)

The polyurethane acrylates and the ethylene diglycol acrylate were mixed with the wetting agents and all the pigments and extenders. The composition was homogenized in the high-speed stirrer followed by a treatment in the bead mill. The hexane-1,6-diacrylate and the coupling agent were added and the mixture was again homogenized, screened, and sprayed without inert solvents onto a primed metal substrate, as described in the preceding examples. Curing was effected at 30 to 40 mrad and at 150 to 220 keV. There was obtained a smooth, hard white surface.

In this example the carnauba wax content was 0.18% of the total composition. When used in lieu of carnauba wax, candelilla wax, ouricouri wax and mineral wax give the same results.

EXAMPLE 4

Preparation of a Canauba Wax Hydrolyzate

Carnauba wax was dissolved in toluene and treated at reflux with aqueous sodium hydroxide for 15 hours. The water was distilled off azeotropically and thereafter the toluene was removed in the rotary evaporator. The residue was dried over phosphorus pentoxide and extracted with n-heptane. The solvent of the extract was evaporated in the rotary evaporator. There was obtained a waxy substance. The latter was dissolved in the heat in an amount of 2.5% by weight in a polyurethane acrylate oligomer which contained 25% by weight of reactive diluent. The resulting solution was sprayed onto a primed metal substrate and cured with electron beams in the presence of atmospheric oxygen at a radiation dosage of 30 mrad and at a potential of 150 to 220 keV. There was obtained a smooth, glossy, hard surface.

We claim:
1. A process for curing a high-energy radiation curable composition, which can be carried out without any protective sheathing in the presence of atmospheric oxygen, comprising the steps of:
   A. forming a homogeneous admixture of a radiation curable composition consisting essentially of ingredients selected from the group consisting of acrylate or methacrylate based monomers, oligomers and polymers with a waxy material selected from the group consisting of:
      i. natural waxes other than paraffin;
      ii. solvent extraction products of natural waxes other than paraffin;
      iii. alcohols of natural waxes other than paraffin;
      iv. esters of natural waxes other than paraffin;
      v. carboxylic acids of natural waxes other than paraffin; and
      vi. mixtures thereof; and
   B. exposing said homogeneous admixture to radiation, thereby curing said radiation curable composition while said admixture remains homogeneous.
2. The process of claim 1, wherein said waxy material is a natural wax selected from the group consisting of:
   A. vegetable waxes;
   B. animal waxes; and
   C. fossil waxes.
3. The process of claim 1, wherein said waxy material is selected from the group consisting of:
   A. a natural wax selected from the group consisting of carnauba wax, candelilla wax, ouricouri wax, and montan wax;
   B. a solvent extraction product of a natural wax selected from the group consisting of carnauba wax, candelilla wax, ouricouri wax, and montan wax;
   C. an alcohol of a natural wax selected from the group consisting of carnauba wax, candelilla wax, ouricouri wax, and montan wax;
   D. an ester of a natural wax selected from the group consisting of carnauba wax, candelilla wax, ouricouri wax, and montan wax;
   E. a carboxylic acid of a natural wax selected from the group consisting of carnauba wax, candelilla wax, ouricouri wax, and montan wax; and
   F. mixtures thereof.
4. The process of claim 1, wherein said forming step is preceded by the step of heating said radiation curable composition to a temperature exceeding the melting temperature of said waxy material.
5. The process of claim 4, wherein said homogeneous admixture is cooled to room temperature with stirring before said exposing step.
6. The process of claim 5, wherein between said cooling step and said exposing step an additive selected from the group consisting of pigments, extenders, reactive diluents, and oligomers is mixed with said homogeneous admixture.
7. The process of claim 6, wherein between said cooling step and said exposing step said homogeneous admixture is ground.
8. The process of claim 1, wherein said radiation curable composition comprises a reactive diluent.
9. The process of claim 1, wherein said waxy material is carnauba wax.
10. The process of claim 1, wherein said waxy material is a hydrolyzate of carnauba wax.

* * * * *